United States Patent
Ferrari et al.

(10) Patent No.: US 12,486,162 B2
(45) Date of Patent: Dec. 2, 2025

(54) METHOD FOR MANUFACTURING A CAPACITIVE PRESSURE SENSOR AND CAPACITIVE PRESSURE SENSOR

(71) Applicant: STMICROELECTRONICS S.r.l., Agrate Brianza (IT)

(72) Inventors: Paolo Ferrari, Gallarate (IT); Flavio Francesco Villa, Milan (IT); Roberto Campedelli, Novate Milanese (IT); Luca Lamagna, Cassina de' Pecchi (IT); Enri Duqi, Milan (IT); Mikel Azpeitia Urquia, Milan (IT); Silvia Nicoli, Casatenovo (IT); Maria Carolina Turi, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 591 days.

(21) Appl. No.: 17/821,717

(22) Filed: Aug. 23, 2022

(65) Prior Publication Data

US 2023/0064114 A1    Mar. 2, 2023

(30) Foreign Application Priority Data

Aug. 30, 2021    (IT) .......................... 102021000022505

(51) Int. Cl.
*B81C 1/00*    (2006.01)
*G01L 9/00*    (2006.01)

(52) U.S. Cl.
CPC ........ *B81C 1/00285* (2013.01); *G01L 9/0073* (2013.01); *B81B 2201/0264* (2013.01)

(58) Field of Classification Search
CPC ............... B81C 1/00285; G01L 9/0073; B81B 2201/0264
See application file for complete search history.

(56) References Cited

U.S. PATENT DOCUMENTS

| 6,012,336 A | 1/2000 | Eaton et al. |
| 6,521,965 B1 | 2/2003 | Lutz |

(Continued)

FOREIGN PATENT DOCUMENTS

| CN | 1564780 A | 1/2005 |
| CN | 1956165 A | 5/2007 |

(Continued)

OTHER PUBLICATIONS

Ashurst et al., "Vapor phase anti-stiction coatings for MEMS," *IEEE Transactions on Device and Materials Reliability*, 3(4):173-178, Dec. 2003.

(Continued)

*Primary Examiner* — Jay C Kim
*Assistant Examiner* — Woo K Lee
(74) *Attorney, Agent, or Firm* — Seed Intellectual Property Law Group LLP

(57) ABSTRACT

The present disclosure is directed to a method for manufacturing a micro-electro-mechanical device. The method includes the steps of forming, on a substrate, a first protection layer of crystallized aluminum oxide, impermeable to HF; forming, on the first protection layer, a sacrificial layer of silicon oxide removable with HF; forming, on the sacrificial layer, a second protection layer of crystallized aluminum oxide; exposing a sacrificial portion of the sacrificial layer; forming, on the sacrificial portion, a first membrane layer of a porous material, permeable to HF; forming a cavity by removing the sacrificial portion through the first membrane layer; and sealing pores of the first membrane layer by forming a second membrane layer on the first membrane layer.

25 Claims, 7 Drawing Sheets

(56) References Cited

U.S. PATENT DOCUMENTS

| | | | |
|---|---|---|---|
| 6,527,961 | B1 | 3/2003 | Vigna et al. |
| 7,763,487 | B2 | 7/2010 | Villa et al. |
| 8,008,738 | B2 | 8/2011 | Villa et al. |
| 8,344,466 | B2 | 1/2013 | Corona et al. |
| 9,824,882 | B2 | 11/2017 | Losa et al. |
| 2004/0020303 | A1 | 2/2004 | Blomberg |
| 2010/0006957 | A1 | 1/2010 | Verheijden et al. |
| 2011/0053321 | A1* | 3/2011 | Huang ................ B81C 1/00333 257/E21.502 |
| 2011/0127650 | A1* | 6/2011 | Witvrouw ........... B81C 1/00333 257/E29.026 |
| 2012/0153408 | A1 | 6/2012 | in 't Zandt et al. |
| 2016/0122181 | A1* | 5/2016 | Picco .................... B81B 7/0051 257/419 |

FOREIGN PATENT DOCUMENTS

| | | |
|---|---|---|
| CN | 105051658 A | 11/2015 |
| CN | 105051907 A | 11/2015 |
| CN | 112964419 A | 6/2021 |
| CN | 218545957 U | 2/2023 |
| WO | WO 2013/061313 A1 | 5/2013 |

OTHER PUBLICATIONS

George, "Atomic Layer Deposition: An Overview," *Chemical Reviews*, 110(1):111-131, 2010.

Puurunen, "Surface Chemistry of Atomic Layer Deposition: A Case Study for the Trimethylaluminum/Water Process," *Journal of Applied Physics*, 97(121301): 55 pages. Mar. 18, 2005.

* cited by examiner

METHOD FOR MANUFACTURING A CAPACITIVE PRESSURE SENSOR AND CAPACITIVE PRESSURE SENSOR

BACKGROUND

Technical Field

The present disclosure relates to a method for manufacturing a micro-electro-mechanical (MEMS) device, and to a micro-electro-mechanical device.

Description of the Related Art

Different techniques are used for forming the membrane, based on the gluing/bonding of two substrates or on the removal of a sacrificial layer.

For example, U.S. Pat. No. 6,521,965 provides for manufacturing the bottom electrode; forming a sacrificial region on the bottom electrode; epitaxially growing the membrane layer; forming etching holes in the membrane layer; removing the sacrificial region through the etching holes; and closing the holes through filling oxide. A similar process is also described by U.S. Pat. No. 6,527,961 for manufacturing pressure sensors. U.S. Pat. No. 6,012,336 uses metal or silicon nitride for filling the etching holes.

In the processes indicated, the filling of the etching holes is a critical step. In fact, using a conformal material is not possible, otherwise this would penetrate into the just-formed cavity and cause it to be at least partially filled, with consequent false capacitive coupling. On the other hand, the use of a non-conformal material, also given the geometric features of the holes, being narrow and deep for applications wherein a thick membrane is required, does not allow the complete closing thereof. In fact, normally the etching holes close in proximity to the top opening before the filling material has completely filled the same holes in the bottom part.

Even the use of two different materials, a first non-conformal material which narrows the top opening and prevents a second conformal material from penetrating inside the cavity, does not solve the problem.

BRIEF SUMMARY

Various embodiments of the present disclosure are directed to a process and a device which overcome the drawbacks of the prior art.

According to the present disclosure, a method for manufacturing a MEMS device and a MEMS device thus obtained are provided. In particular, the disclosure relates to the manufacturing of a capacitive pressure sensor and to the capacitive pressure sensor thus obtained. The capacitive pressure sensor is provided with a suspended region, or membrane, capable of moving with respect to the rest of the structure. In particular, this membrane represents a variable electrode, facing a fixed portion forming a fixed electrode and separated therefrom by a partially or totally buried cavity.

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein.

DETAILED DESCRIPTION

FIGS. 1-14 show subsequent manufacturing steps of a microelectromechanical (MEMS) device or system 30 according to an embodiment of the present disclosure. In particular, the MEMS device 30 integrates microelectromechanical structures for transducing one or more environmental pressure signals into respective electrical signals. In particular, the transduction is performed on the basis of a variation of a capacitance. Hereinafter, therefore, the MEMS device 30 is also referred to as a pressure sensor, or capacitive pressure sensor.

FIGS. 1-14 illustrate a wafer in lateral cross-section view, in a triaxial reference system of axes X, Y, Z orthogonal to each other.

Figure 1:
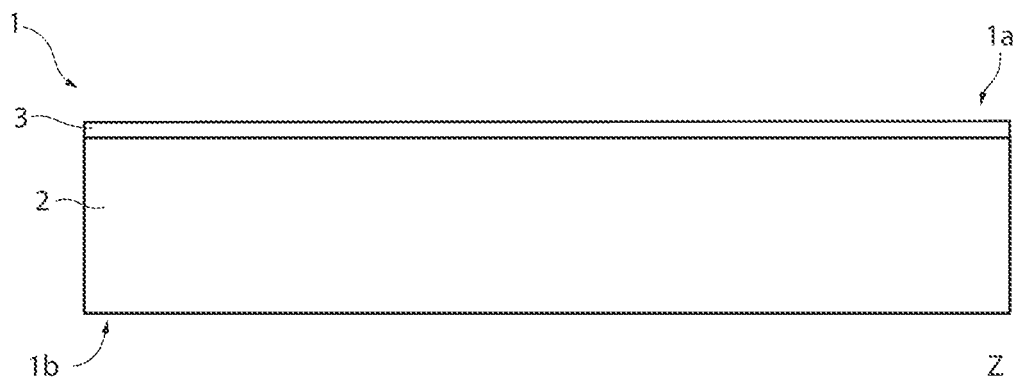
FIGS. 1-14 illustrate, in lateral cross-section view, manufacturing steps of a micro-electro-mechanical device, in particular a capacitive pressure sensor according to an embodiment of the present disclosure.
Figure 1:

FIG. 1 shows the wafer 1, having a front side 1a and a rear side 1b opposite to each other along the axis Z, comprising a substrate 2 of semiconductor material, typically silicon. At the front side 1a, the substrate 2 is overlaid by an insulating layer 3, for example silicon oxide ($SiO_2$) having a thickness comprised between 0.2 and 2 μm, typically 0.5 μm. The insulating layer 3 is for example formed through thermal oxidation.

Figure 2:
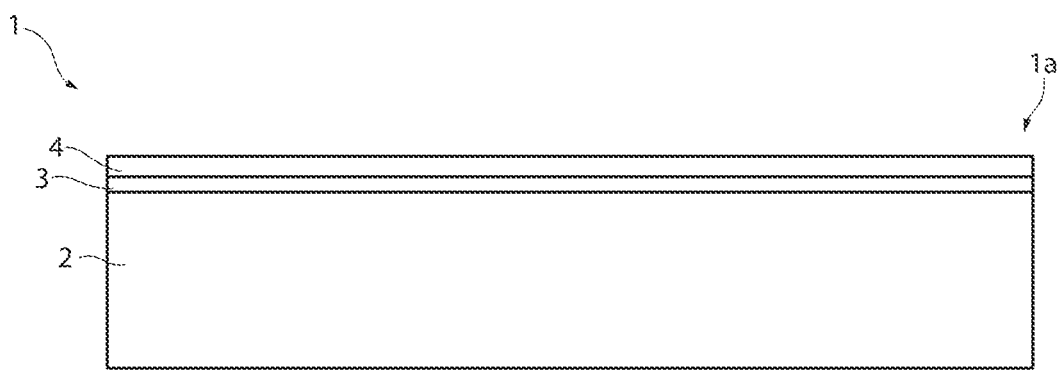
Figure 2:
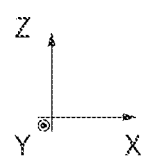

In FIG. 2, a structural layer 4, of electrically conductive material, for example of N-type doped polysilicon (e.g., with doping density comprised between $1 \cdot 10^{19}$ and $2 \cdot 10^{20}$ ions/$cm^3$), is formed on the insulating layer 3. In one embodiment, the structural layer 4 is formed through deposition of polysilicon with LPCVD technique.

With reference to the pressure sensor of capacitive type, the structural layer 4 forms a bottom electrode of the pressure sensor (i.e., the bottom plate of the capacitor).

Figure 3:
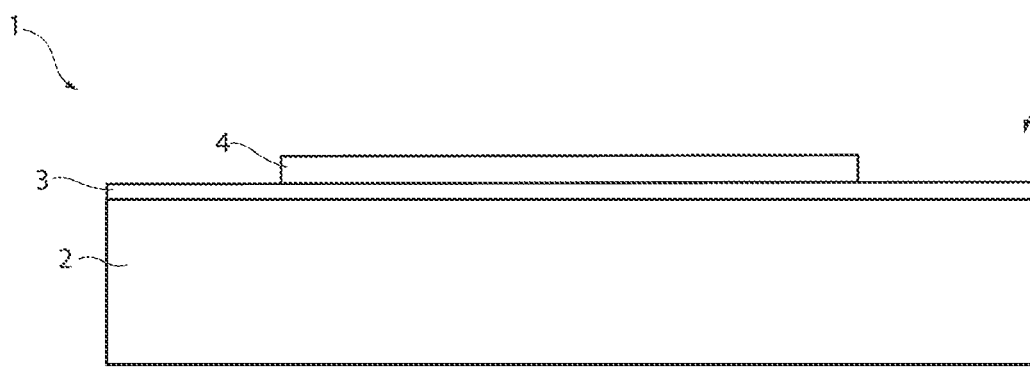
Figure 3:
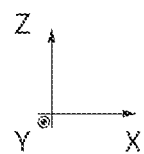

Subsequently, FIG. 3, the structural layer 4 is patterned (e.g., photolithographically) to define the desired and/or expected shape during the design step of the bottom electrode of the pressure sensor.

Figure 4:
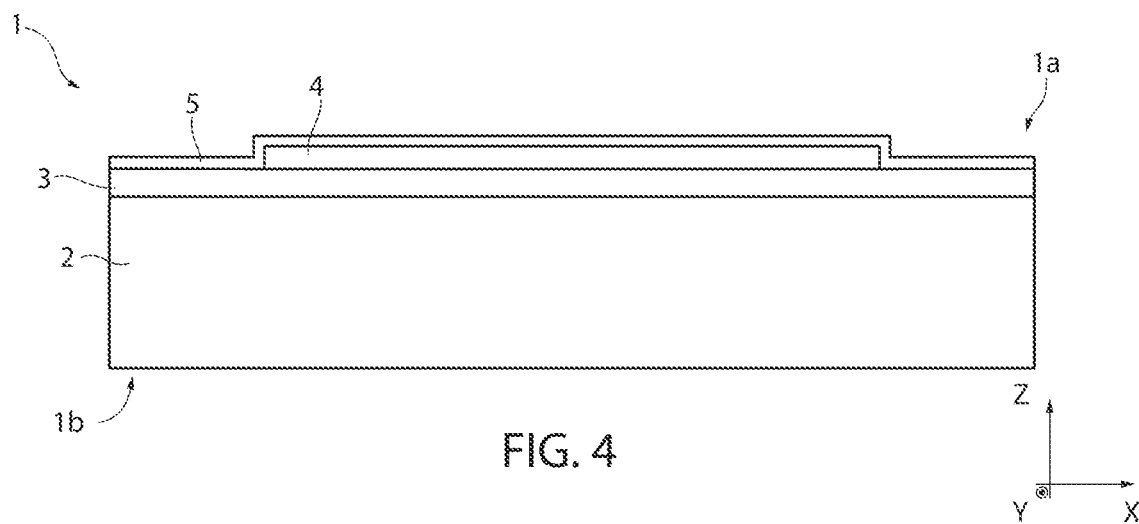

The method then proceeds, FIG. 4, with the formation, above the structural layer 4 (and above the exposed portions of the insulating layer 3) of an etch stop layer 5. The etch stop layer 5 is, according to an embodiment of the present disclosure, of aluminum oxide ($Al_2O_3$), also known as alumina. The etch stop layer 5 has, for example, a thickness of a few tens of nanometers, for example comprised between 20 and 60 nm, in particular 40 nm.

The etch stop layer 5 is formed through Atomic Layer Deposition (ALD) technique. The deposition of $Al_2O_3$ through ALD technique is typically performed using trimethyl-aluminum (TMA, $Al(CH_3)_3$) and water ($H_2O$) vapors as reactants. Alternatively to $H_2O$ vapors, ozone ($O_3$) may be used. For example, deposition may occur using TMA as the aluminum source and $H_2O$ as the oxidant. The document by Steven M. George, Chem. Rev. 2010, 110, p.

111-131, or the document by Puurunen, R. L., J. Appl. Phys. 2005, 97, p. 121-301, describe possible methods for forming the etch stop layer 5.

Patent document WO 2013/061313 also describes a method for forming an etch stop layer of $Al_2O_3$ usable in the context of the present disclosure. In particular, as described in WO 2013/061313, the etch stop layer 5 is formed with a process which provides for ALD deposition of two intermediate layers of $Al_2O_3$, both being subject to crystallization. The sequence of: i) deposition of a first intermediate layer of $Al_2O_3$, ii) crystallization of the first intermediate layer, iii) deposition of a second intermediate layer of $Al_2O_3$, and iv) crystallization of the second intermediate layer, allows the formation of an etch stop layer 5 of $Al_2O_3$, having properties of being resistant to etch solutions containing hydrofluoric acid (HF) and, above all, impermeability properties of the etch stop layer 5 to such HF-based solutions.

Furthermore, this etch stop layer 5, in addition to being resistant to etching with HF and impermeable to HF, shows optimum stiction properties to the underlying silicon oxide layer 3 and to the polysilicon layer 4, shows optimum dielectric properties which do not vary as a function of any subsequent thermal treatments, shows little (negligible) variation in the warpage radius of the wafer 1, and shows high compatibility with thermal processes at high temperature (above 1000° C.).

Figure 5:
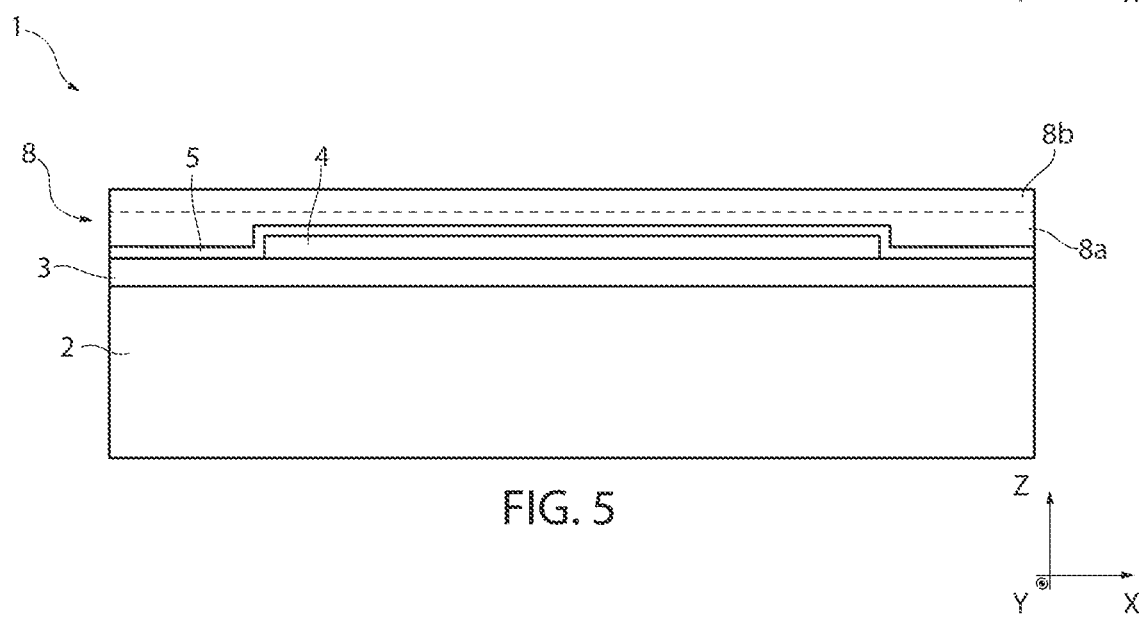

Then, FIG. 5, a sacrificial layer 8, e.g., of silicon oxide, is formed. The thickness of this sacrificial layer 8, at and above the structural layer 4, is comprised between 0.4 and 2 µm (or in any case chosen according to the capacitance value). To compensate for the presence of the "step" between the insulating layer 3 and the structural layer 4, and to form a sacrificial layer 8 having a planar top surface, a planarization step is performed (e.g., via CMP) after forming the sacrificial layer 8.

Alternatively, the sacrificial layer 8 may be formed in two sub-steps subsequent to each other, comprising:
  forming a first sacrificial sub-layer 8a, here of silicon oxide deposited with the plasma-enhanced chemical vapor deposition (PECVD) technique (TEOS or oxide based on silane), up to complete coverage of the etch stop layer 5 in the region thereof which extends above the structural layer 4; the thickness tox1 of the first sacrificial sub-layer 8a, measured along the axis Z laterally to the structural layer 4, is greater than the sum of the thicknesses of the structural layer 4 and etch stop layer 5 (e.g., between 700 nm and 1.5 µm);
  planarizing the first sacrificial sub-layer 8a, for example with the CMP technique, to obtain a top surface of the same planar but without exposing portions of the underlying etch stop layer 5;
  forming a second sacrificial sub-layer 8b, here of silicon oxide deposited with the PECVD technique (TEOS or oxide based on silane), above the first sacrificial sub-layer 8a; the thickness tox-c of the second sacrificial sub-layer 8b, measured along the axis Z from the top surface of the first sacrificial sub-layer 8a, is comprised between 300 nm and 2 µm.

The first and second sacrificial sub-layers 8a, 8b form, together, the sacrificial layer 8. The thickness of this sacrificial layer 8 is chosen according to the desired capacitance value (e.g., between 500 nm and 2.3 µm).

Figure 6:
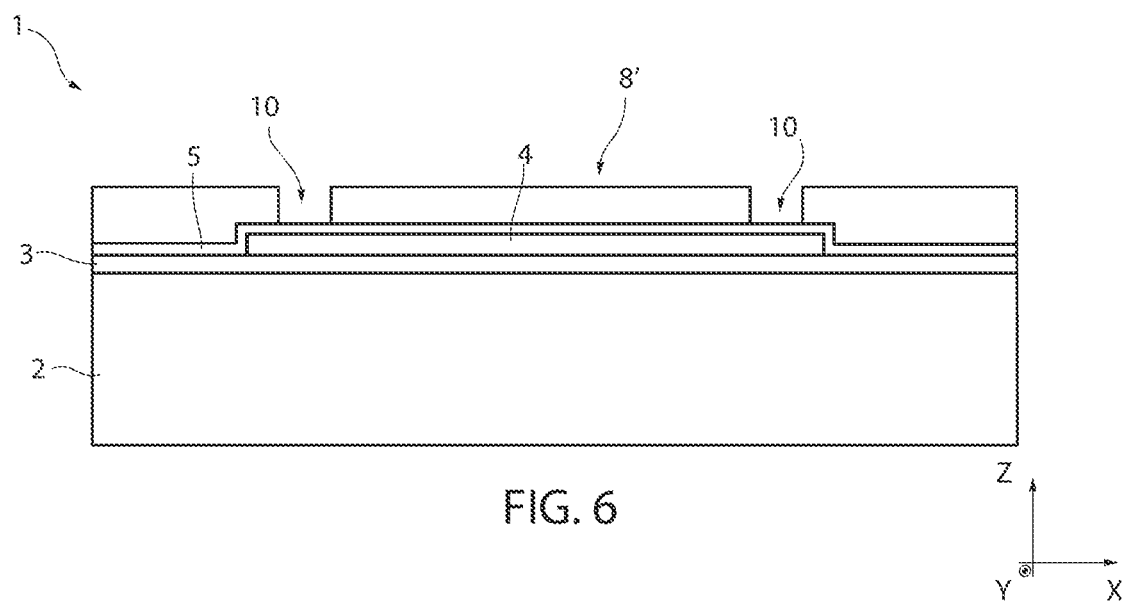

Then, FIG. 6, an etching of the sacrificial layer 8 is performed so as to form a trench 10 which surrounds, or internally delimits, a region 8' of the sacrificial layer 8. The trench 10 extends along the axis Z throughout the thickness of the sacrificial layer 8. In this manner, the region 8' is separated from the remaining portions of the sacrificial layer 8 by the trench 10. The shape of the region 8', defined by the trench 10, corresponds to the desired shape of the cavity having the two conductive plates of the capacitor which forms the sensitive element of the pressure sensor facing therethrough, as better evident from the following description.

Figure 7:
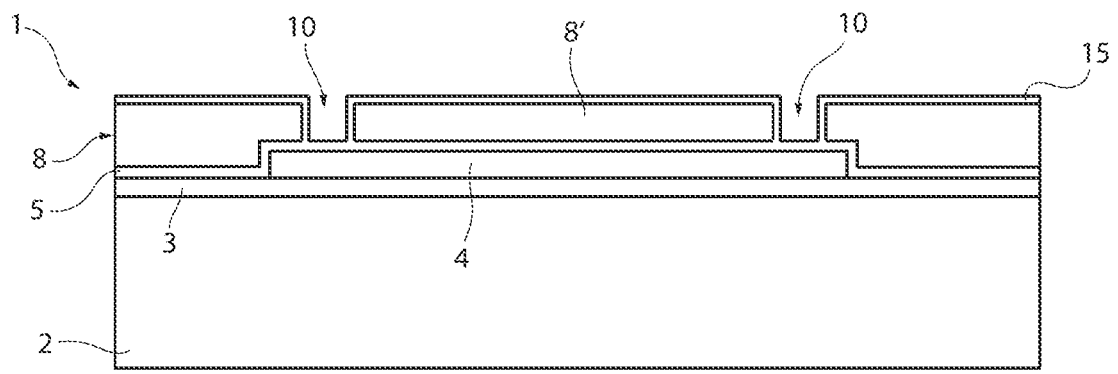

Then, FIG. 7, the method proceeds with the formation, above the sacrificial layer 8 (comprising the region 8') and in the trench 10, of a further etch stop layer 15. The etch stop layer 15 is, according to one embodiment of the present disclosure, of aluminum oxide ($Al_2O_3$), with a thickness of a few tens of nanometers, e.g., comprised between 20 and 60 nm, in particular 40 nm.

The etch stop layer 15 is formed according to the same method previously discussed for the etch stop layer 5.

Figure 8:
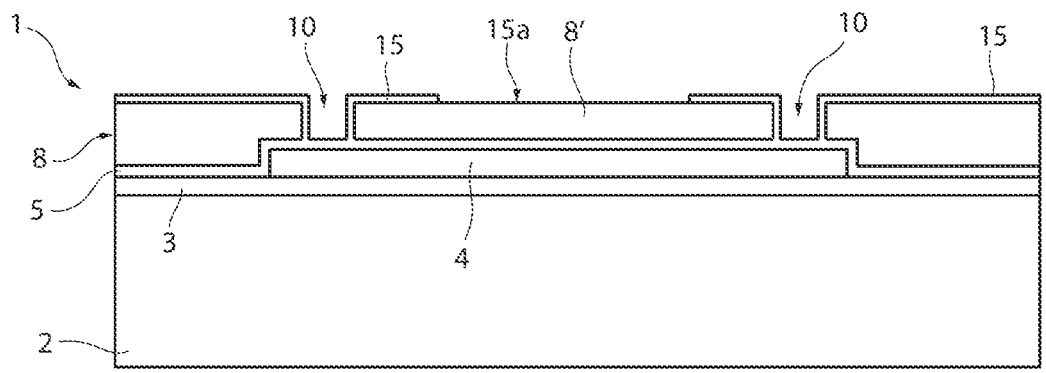

Then, FIG. 8, the etch stop layer 15 is patterned by removing selective portions thereof above the region 8', forming a cavity 15a through the etch stop layer 15, until reaching the surface of the region 8'. At least one portion of the surface of the region 8' is thus exposed through the cavity 15a. The zone of the region 8' exposed in this process step (i.e., the cavity 15a) defines the shape and the spatial extent of the top plate of the capacitor which forms the active element of the pressure sensor, as better evident from the following description.

Figure 9:
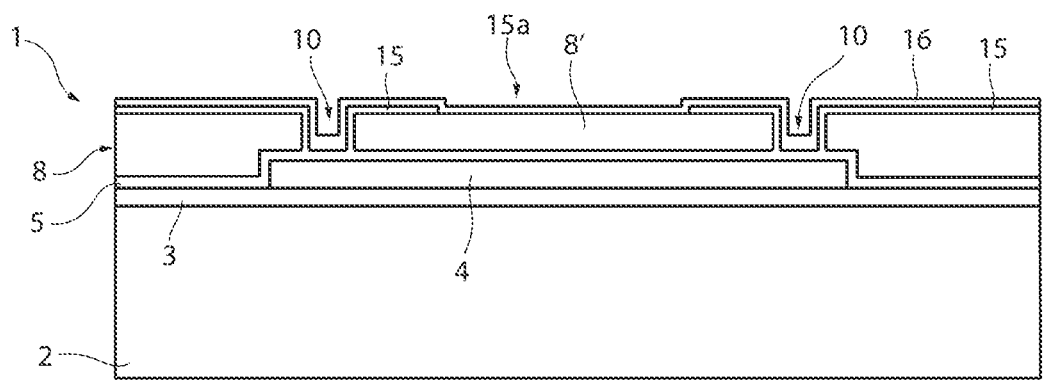

Then, FIG. 9, a deposition step of a structural layer 16 above the etch stop layer 15 and in the cavity 15a is performed, covering the surface of the region 8'. In one embodiment, the structural layer 16 is of conductive material, for example of doped polysilicon (e.g., with doping comprised between $1 \cdot 10^{18}$ and $2 \cdot 10^{20}$ ions/cm$^3$). Alternatively, the structural layer 16 may be of undoped polysilicon.

The structural layer 16 is for example deposited with the LPCVD technique. The structural layer 16 has a thickness, e.g., comprised between 0.2 µm and 1 µm.

Figure 10:
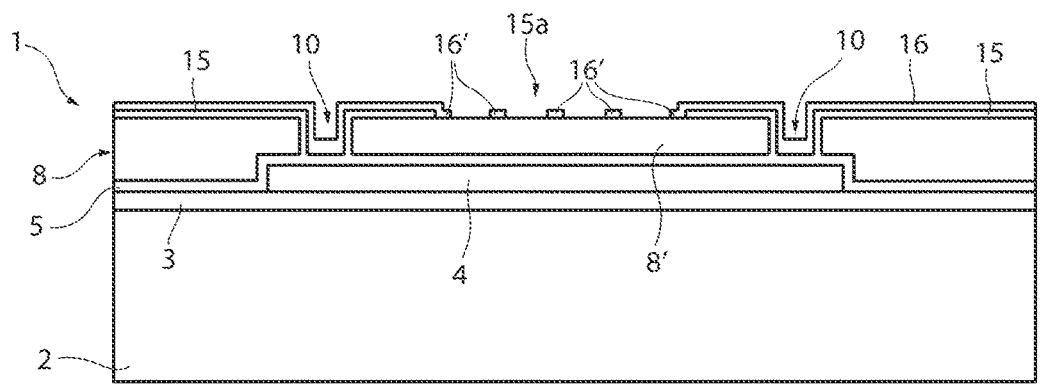

Subsequently, FIG. 10, the structural layer 16 is defined, for example photolithographically, to selectively remove it at the cavity 15a. In particular, in one embodiment, the structural layer 16 is not completely removed at the cavity 15a, so as to leave regions 16' which function as anchors for a subsequent layer that will be deposited later on (layer 20, illustrated in FIG. 11). It is apparent that, in other embodiments, in case this anchor does not have to structurally support the layer 20 of FIG. 11, the regions 16' are not formed and the structural layer 16 is completely removed at the cavity 15a.

Figure 11:
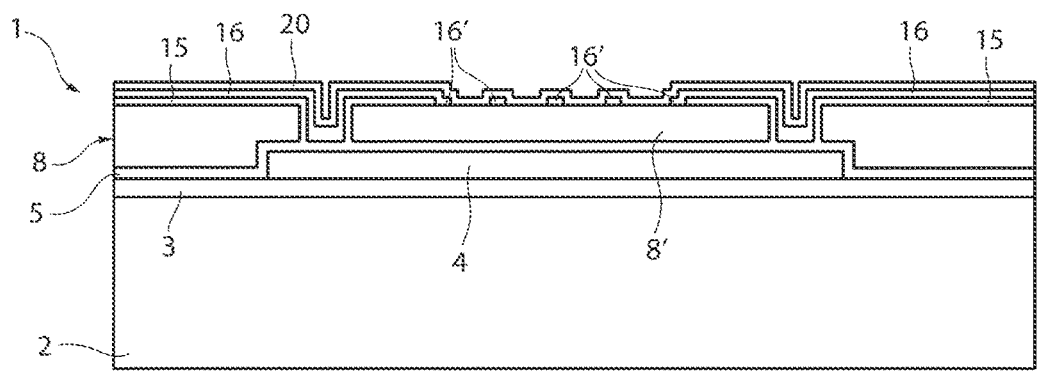

Then, FIG. 11, as mentioned, a permeable layer 20 is formed above the structural layer 16, the anchor regions 16' (if any) and the region 8' exposed between the anchor regions 16'.

The permeable layer 20 is, in one embodiment of the present disclosure, of polysilicon being permeable to the chemical solution used for the subsequent removal of the region 8'. For example, in the described embodiment, wherein the region 8' is of silicon oxide, hydrofluoric acid (HF), or solutions containing HF, may be used to selectively remove the region 8'. In this case, the permeable layer 20 is provided with pores or openings for allowing the flow of the hydrofluoric acid through the permeable layer 20, reaching and removing the region 8' and forming a buried cavity or chamber 22.

The permeable layer 20 is, in particular, of polycrystalline silicon, having holes (or pores) with a diameter ranging from 1 to 50 nm. The thickness of the permeable layer 20 is in the range of 50 to 150 nm, for example of 100 nm. The permeable layer 20 is for example deposited through LPCVD technique. According to an exemplary, non-limiting embodiment, the deposition conditions are in the traction-to-compression transition region, with a process window around 600° C. using a silane source gas, in a deposition environment with a pressure of about 550 mtorr. The dimensions of the pores of the permeable layer 20 are, in general, chosen in such a way that the chemical etching solution (liquid or gaseous) used to remove the region 8' may penetrate through the pores until reaching the permeable layer 20.

In general, the permeable layer 20 may be porous polysilicon, or polysilicon having holes (openings) actively formed following its deposition, through mechanical or physicochemical action for selectively removing the material.

Figure 12:
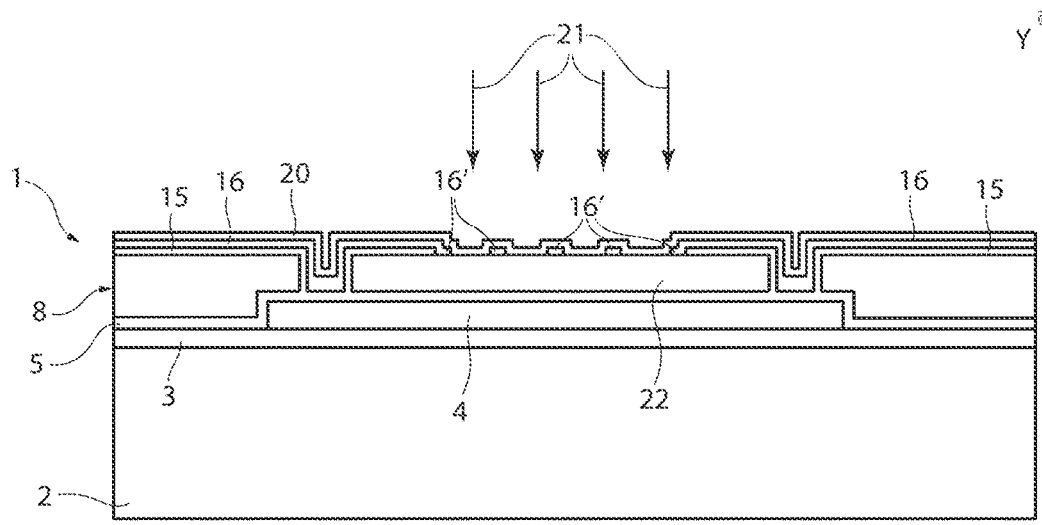

With reference to FIG. 12, an etching step of the region 8' (identified by arrows 21) is performed with HF or buffered HF mixtures or with vapor etching techniques using HF in the form of vapor. The material of the region 8' is completely removed and the buried cavity 22 is formed. As mentioned, the chemical agent used for the etching permeates through the openings or pores of the permeable layer 20.

Figure 13:
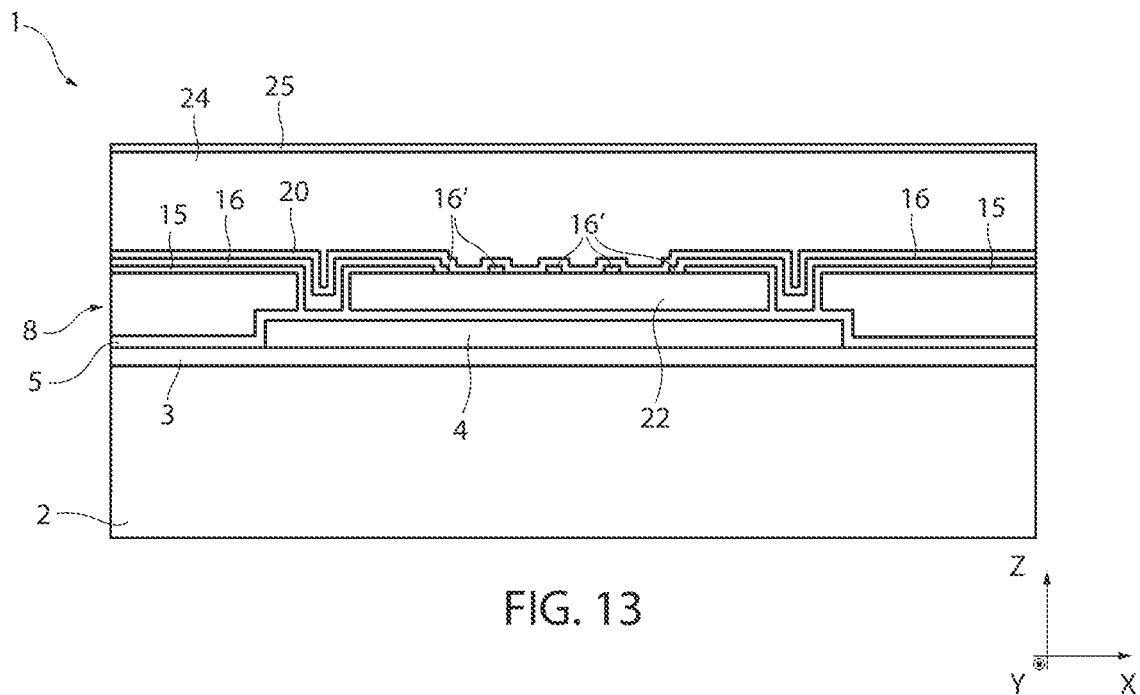

Then, FIG. 13, a sealing layer 24 is formed (e.g., by performing an epitaxial growth of amorphous silicon) on the permeable layer 20, to form a second electrode operatively coupled to the first electrode (i.e., the layer 4 formed in FIG. 3) through the cavity 22. The sealing layer 24 has a thickness, e.g., comprised between 0.2 μm and 2 μm. The amorphous silicon of the sealing layer 24 may be deposited with the PECVD technique, at a deposition temperature between 200 and 400° C., using $SiH_4/H_2$ or $SiH_4/He$ as precursors. Depending on the application, the sealing layer 24 may be doped in-situ using phosphine ($PH_3$) or biborane ($B_2H_6$). In the context of the present disclosure, the sealing layer is electrically conductive (made as such through doping).

One or more further layers 25 may be deposited or formed on the sealing layer 24, for example one or more layers of a respective material from among: polysilicon, $Al_2O_3$, $HfO_2$, SiN (PE) having a function of passivation or reinforcement.

The sealing of the permeable layer 20 (and therefore of the buried cavity 22) may occur in a controlled-pressure environment (reaction chamber), in order to set a desired pressure value in the buried cavity 22. This pressure value may vary for example between 0.09 mbar to 205 mbar.

Alternatively, however, it is noted that the use of the PECVD technique to form the sealing layer 24, by depositing amorphous silicon, allows the generation of a desired pressure in the buried cavity 22. In fact, the product between the deposition temperature of the layer 24 (about 350° C.) and the working pressure in the reaction chamber (about 1.5 Torr) allows to have, once the layer 24 has cooled, a low pressure inside the cavity 22.

Figure 14:
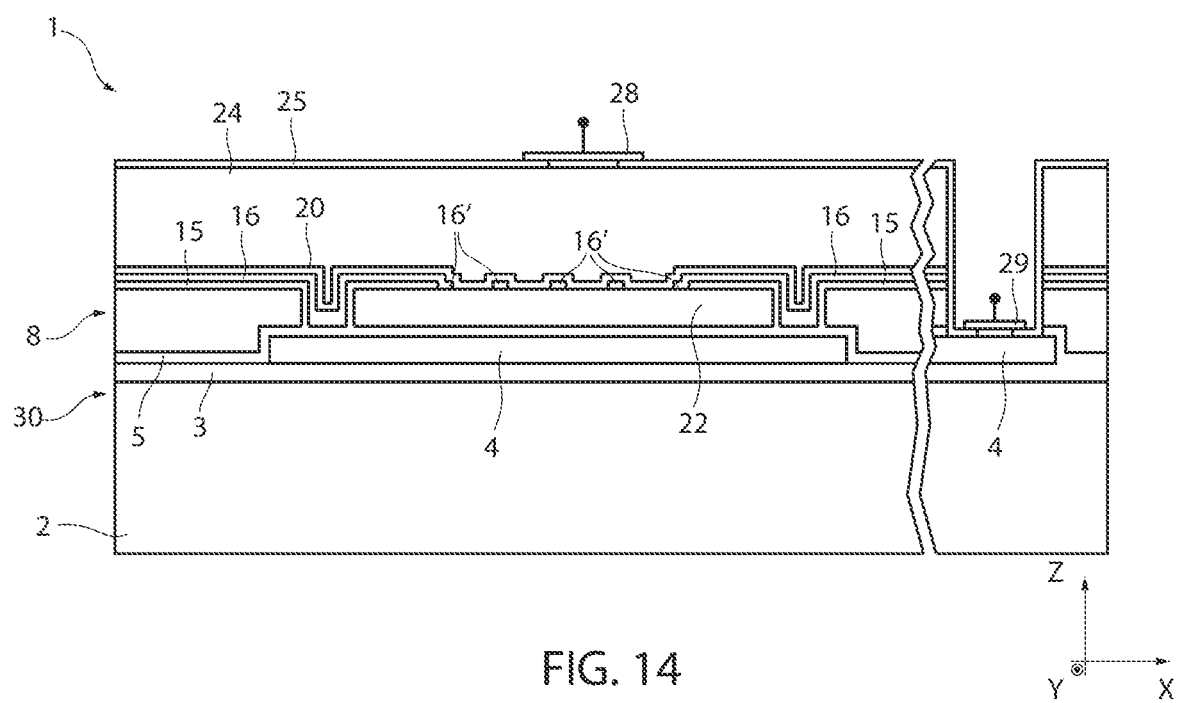

Then, with reference to FIG. 14, conductive pads 28, 29 are formed to allow biasing from the outside of the sensing electrodes of the pressure sensor thus manufactured. A conductive pad 28 is electrically coupled to the sealing layer 24, while the other conductive pad 29 is electrically coupled to the structural layer 4, lateral to the buried cavity 22. The pads 28, 29 are formed by depositing conductive material, for example metal such as aluminum and patterning it to achieve the desired extensions for the pads.

In one embodiment, in order to put the conductive pad 29 in contact with the structural layer 4, a step of selectively removing the layers 25, 24, 20, 16, 15 and possibly the layer 8 (if any in the zone where the pad 29 is desired to be formed) is performed.

In order to protect the layers exposed through the opening thus formed, the formation of the one or more layers 25 previously described may occur after the formation of such an opening (therefore the one or more layer 25 is also deposited inside this opening) and before the formation of the pad 29.

Alternatively, the conductive pad 29 may be put into electrical contact with the structural layer 4 through a conductive path extending between the structural layer 4 and the conductive pad 29.

A MEMS device 30 is thus formed, particularly a pressure sensor of capacitive type, even more particularly an absolute pressure sensor configured to sense a pressure variation external to the sensor with respect to the pressure value present inside the buried cavity 22 (fixed value, set, as described, during the manufacturing step).

The pressure sensor 30 is provided with a supporting body (substrate 2 plus layer 3) having the first electrode (layer 4) of the capacitor used for capacitive sensing extending thereon. The first electrode faces the buried cavity 22 (in particular, with interposed layer 5). The second electrode (layer 20 plus layer 24) extends above the buried cavity 22, opposite to the first electrode 4. The first and second electrodes thus face each other through the buried cavity 22. The second electrode is a membrane configured to deflect along the axis Z. The pressure variation in the environment external to the pressure sensor 30 causes a deflection of the second electrode and a consequent variation in the capacitance of the capacitor thus formed, which is sensed by the conductive pads 28, 29, and processed through circuitry.

Figure 15A:
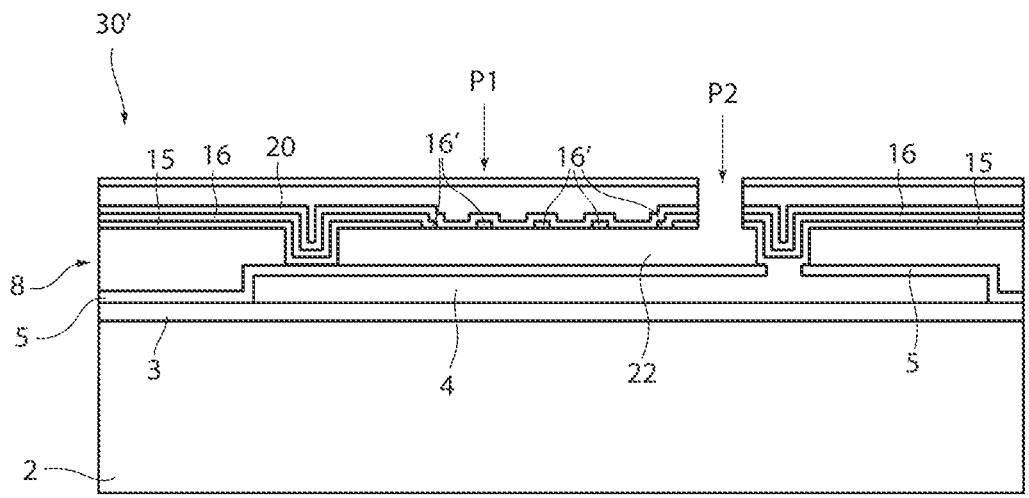
FIG. 15A illustrates, in lateral cross-section view, a differential capacitive pressure sensor according to a further embodiment of the present disclosure.

According to a different and further embodiment (FIG. 15A), the MEMS device is a differential capacitive pressure sensor 30', configured to provide a signal identifying the difference between two environmental pressures at which the same sensor is subject. The pressure sensor 30' is manufactured according to the same steps previously described for the pressure sensor 30 (FIGS. 1-14), except for the cavity 22 which has to be connected to the outside, in order to be able to operate the sensor 30' as a differential sensor. To this end, the cavity 22 is fluidically connected to the outside of the pressure sensor 30', e.g., through a suitably provided channel which allows the flow of air (or other fluid in gaseous form) to the cavity 22. The resulting deformation of the membrane (second electrode) is indicative of the difference between a first environmental pressure P1 (external to the cavity 22) and a second environmental pressure P2 (internal to the cavity 22), and the signal transduced by the differential pressure sensor 30' is a differential pressure signal.

Figure 15B:
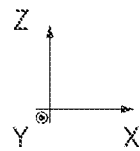
FIG. 15B illustrates a package wherein the pressure sensor of FIG. 15A is accommodated or accommodable.

With reference to FIG. 15B, the differential pressure sensor 30' is provided with a package 32 (common elements of the pressure sensor 30' with the pressure sensor 30 are identified with the same reference numbers). The package 32 includes an internal housing 33 having the differential pressure sensor 30' accommodated or arranged therein. The package 32 has a first through opening 32a, configured to put the membrane (second electrode) of the differential pressure sensor 30' in fluidic communication with the environment external to the package 32, and to form an access channel for the pressure P1 to the membrane (but not to the cavity 22). The package 32 also has a second through opening 32b, configured to put the cavity 22 in fluidic communication with the environment external to the package 32, and to form an access channel for the pressure P2 to the cavity 22 (but not to the membrane). The first and second through openings 32a, 32b are thus formed and connected to the pressure sensor 30' in such a way that, inside the package 32, the pressures P1 and P2 remain separate, in order to allow the correct operation of the pressure sensor in differential mode. In other words, the pressure sensor 30' is mounted in the package 32 in such a way that the access channel to the cavity 22 is connected to the second through opening 32b through suitable fluid-tight (watertight) means or systems, preventing a fluidic connection of the second through opening 32b with other regions of the internal chamber of the package 32.

The differential pressure sensor 30' is therefore suitable for mounting in systems/components wherein the first through opening 32a is in communication with a first environment at environmental pressure P1 and the second through opening 32b is in communication with a second environment having environmental pressure P2. The first through opening 32a thus forms an access for the pressure P1 which acts on a first side of the membrane (e.g., side external to the cavity 22), deforming it. The second through opening 32b forms a respective access for the pressure P2 which acts on a second side, opposite to the first side (e.g., side internal to the cavity 22), of the membrane generating a force deforming the membrane which opposes to the force generated by the pressure P1. The resulting deformation of the membrane is indicative of the difference between the pressure P1 and the pressure P2, and the signal transduced by the differential pressure sensor 30' is a differential pressure signal.

Patent documents U.S. Pat. Nos. 7,763,487 and 8,008,738 describe packages usable in the context of the present disclosure, to package a pressure sensor 30' of differential type.

Figure 16:
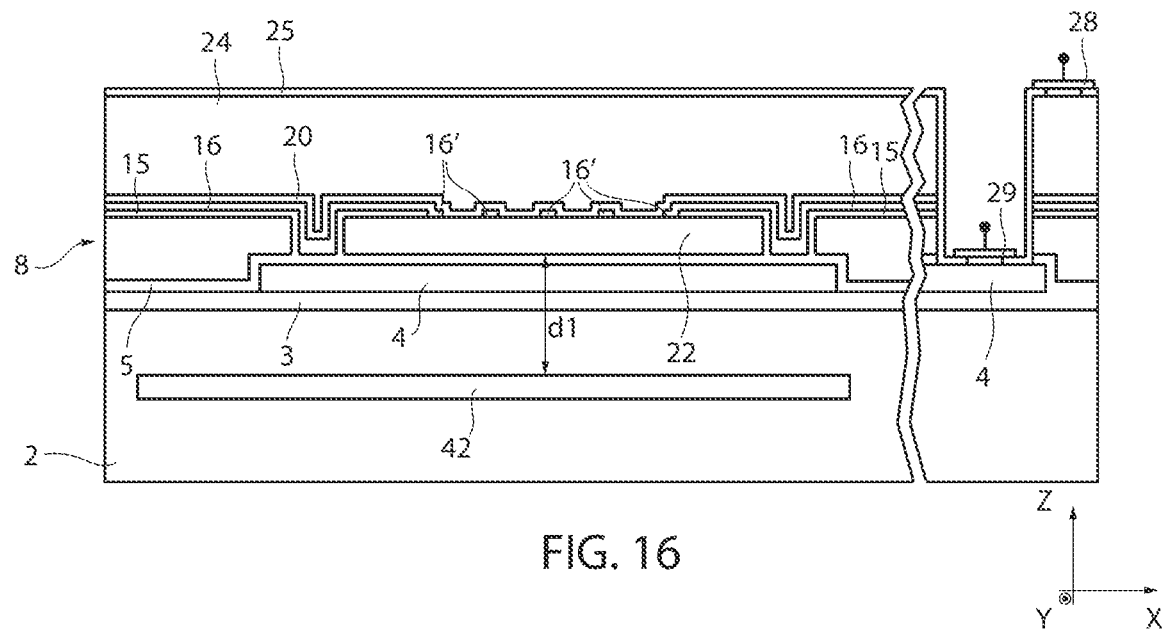
FIG. 16 illustrates a capacitive pressure sensor according to a further embodiment of the present disclosure.

FIG. 16 illustrates a further embodiment of a MEMS device according to the present disclosure, applicable to both the pressure sensor 30 and the pressure sensor 30'. The MEMS device illustrated in FIG. 16 comprises all the elements and technical features previously described in the respective embodiments.

The MEMS device of FIG. 16 further comprises a further buried cavity or chamber 42 extending into the substrate 2, below the first electrode (i.e., below the layer 4). This buried cavity 42 extends, for example, to a distance $d_1$ (measured along the axis Z) from the bottom of the cavity 22 comprised between 20 μm and 60 μm. In this manner, the portion of wafer 1 above the buried cavity 42 forms a further membrane which may deflect to release any residual stresses from the manufacturing or which may arise during the use of the MEMS device 30, 30', preventing any structural problems such as breakages, cracks, deformations.

The buried cavity 42 may be formed, for example according to the formation process of buried cavities described in U.S. Pat. Nos. 7,763,487 and 8,008,738.

Figure 17:
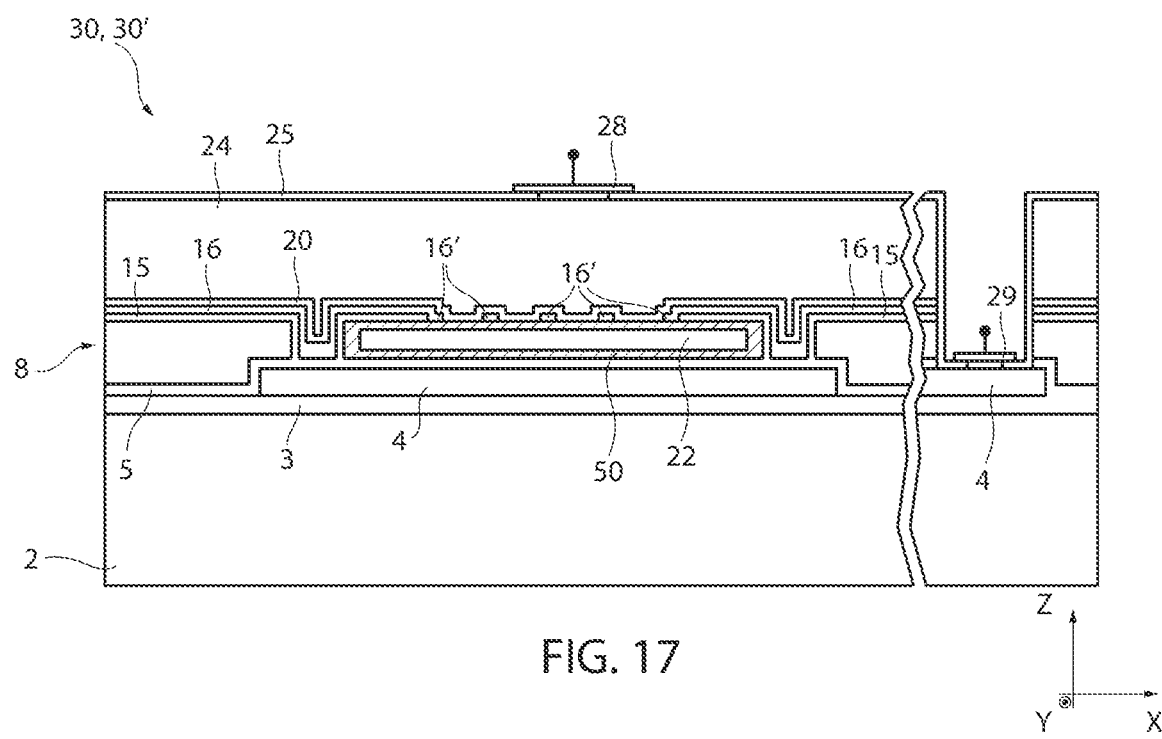
FIG. 17 illustrates a capacitive pressure sensor according to a further embodiment of the present disclosure.

According to a further embodiment of the present disclosure, illustrated in FIG. 17, both the MEMS device 30 and the MEMS device 30' comprise a respective anti-stiction layer 50 inside the buried cavity 22 and/or the buried cavity 42 (if any). For simplicity of description and illustration, FIG. 17 does not show the buried cavity 42, however, as mentioned hereinabove, what has been described also applies to the case in which this buried cavity 42 is present.

The anti-stiction layer 50 may cover the internal walls of the cavity 22 (and/or cavity 42) completely or partially.

The anti-stiction layer 50 is of a material chosen in such a way as to limit or prevent even the partial occlusion of the cavity 22 (and/or cavity 42) due to a potential mutual stiction of the walls that delimit the cavity 22 (and/or cavity 42) upwardly and downwardly. This unwanted effect would cause the impossibility for the second electrode to move correctly and consequent failure of the MEMS device 30/30'.

To this end, the anti-stiction layer 50 may be introduced into the cavity 22 through a suitable opening which puts the cavity 22 in communication with the environment in which the deposition of the anti-stiction layer 50 occurs. This opening may later be closed in the case of an absolute pressure sensor 30, or may be the opening used to put the cavity 22 in fluidic communication with the external environment in the case of a differential pressure sensor 30', which therefore remains fluidically accessible.

The deposition of the anti-stiction layer 50 may occur through a vapor-phase process.

Materials usable for the anti-stiction layer 50 include, but are not limited to, chlorosilanes, trichlorosilanes, dichlorosilanes, siloxanes, or a combination thereof, etc., such as, for example:

DDMS—"dimethyldichlorosilane";
FOTS—"perfluorooctyltrichlorosilane";
PF10TAS—"perfluorodecyltris(dimethylamino)silane";
PFDA—"perfluorodecanoic acid"; or
a combination thereof.

Usable materials and the deposition processes thereof may be found in, for example, Ashurst, W. & Carraro, C. & Maboudian, Roya. (2004), "Vapor phase anti-stiction coatings for MEMS" Device and Materials Reliability, IEEE Transactions on. 3. 173-178. 10.1109/TDMR.2003.821540.

The manufacturing methods and the devices described above, according to the various embodiments, have numerous advantages.

Thanks to the monolithic structure of the membrane, substantially free of empty zones, the membrane is robust and therefore particularly suitable for providing MEMS structures of different types, reducing the risk of breakage, deformation or damage that compromise its functionality.

The process is easy to carry out, since it does not have any particular criticalities or difficulties of execution, thus ensuring high yields and reduced final costs. It is also noted that the manufacturing method uses a single wafer of semiconductor material, thus resulting economically advantageous and with reduced criticalities due to the absence of gluing or bonding steps between wafers.

Furthermore, the manufacturing method is particularly flexible, since it allows to provide buried cavities and/or membranes of the desired shape and size, both as regards the area and the thickness, in a simple manner. In particular, for the application as a pressure sensor, a high thickness of the membrane may be obtained, to increase the accuracy of the same sensor.

The use of porous silicon ensures that a membrane with a regular shape is obtained and prevents unwanted formations that would compromise or in any case reduce the electrical/mechanical features of the finished MEMS device.

The simultaneous presence of the two crystallized aluminum oxide layers prevents short circuits between the top and bottom electrodes of the capacitor and allows the diameter of the membrane, which is not dependent on the etching time, to be defined during the manufacturing step.

Furthermore, thanks to the use of the two crystallized aluminum oxide layers, the size of the membrane may be accurately defined, without using a time-etching. In fact, the crystallized aluminum oxide functions as a hard mask for the subsequent HF etching aimed at removing the oxide layer under the membrane.

The use of a HF-permeable polysilicon layer enables the formation of a porous grid that allows the HF to permeate and etch the oxide. The permeable polysilicon also serves as a support for the top layers.

The use of the amorphous silicon layer 24 (deposited through PECVD), thanks to which closing the porous polysilicon layer is fast, also allows the definition of a desired pressure in the buried cavity 22. In fact, the product between deposition temperature (about 350° C.) and the working pressure in the reaction chamber (about 1.5 Torr) allows to have, once the amorphous silicon layer 24 has cooled, a high vacuum inside the cavity 22. Furthermore, by using amorphous silicon, and performing a PECVD deposition, the volume of the cavity 22 is not reduced by unwanted or waste products.

Finally, it is clear that modifications and variations may be made to the method and device described and illustrated herein without thereby departing from the scope of the present disclosure.

The teachings of the present disclosure may be used to provide MEMS devices of different types with respect to those described, such as accelerometers, gyroscopes, resonators, valves, inject print heads and the like, in which case the structures below and/or above the membrane are adapted according to the intended application. In any case, the size, shape and number of channels are optimized according to the application and the MEMS device is completed with the structures and elements for its operativeness.

In case integrating electronic components in the same wafer 1 is desired, this may be carried out using the substrate 2 or further epitaxial layers formed above the sealing layer 24.

A method for manufacturing a micro-electro-mechanical device (30; 30'), may be summarized as including the steps of forming, on a substrate (2), a first protection layer (5) impermeable to an etching chemical solution; forming, on the first protection layer (5), a sacrificial layer (8, 8') of a material that may be removed through said etching chemical solution; forming, on the sacrificial layer (8, 8'), a second protection layer (15) impermeable to said etching chemical solution; selectively removing a portion of the second protection layer (15) to expose a respective sacrificial portion (8') of the sacrificial layer (8, 8'); forming, on said sacrificial portion (8'), a first membrane layer (20) of a porous material, which is permeable to said etching chemical solution; forming a cavity (22) by removing the sacrificial portion (8') through the first membrane layer (20) using said etching chemical solution; and sealing pores of the first membrane layer (20) by forming a second membrane layer (24) on the first membrane layer (20).

Said etching chemical solution may include hydrofluoric acid, HF, and said first and second protection layers (5, 15) may include crystallized Aluminum Oxide.

The first membrane layer (20) may be of porous silicon or silicon having a plurality of through holes or pores.

Forming the second membrane layer (24) may include depositing doped amorphous silicon through PECVD technique.

The method may further include the step of forming, on the substrate (2), a conductive layer (4), wherein the step of forming the first protection layer (5) may include forming the first protection layer (5) above the conductive layer (4), said conductive layer (4) and said second membrane layer (24) being capacitively coupled to each other through the cavity (22).

The conductive layer (4) may be of doped polysilicon.

The method may further include the step of forming a buried chamber (42) in the substrate (2) below, and at least partially aligned with, the cavity (22).

The method may further include the step of fluidically connecting the cavity (22) with an environment external to said micro-electro-mechanical device (30; 30') through a through opening.

The method may further include the step of internally covering the cavity (22) through an anti-stiction layer causing chemical species including chlorosilanes, trichlorosilanes, dichlorosilanes, siloxanes to flow through said through opening.

The method may further include the steps of arranging said micro-electro-mechanical device (30; 30') inside a package (32) having an internal housing and being provided with a first access channel (32a; 32b) and with a second access channel (32b; 32a) towards said internal housing; and coupling said one of the first and second access channels (32a; 32b) to the through opening through fluid-tight means or systems configured to prevent a fluidic connection between said internal housing of the package (32) and said cavity (22).

Said micro-electro-mechanical device (30; 30') may be a capacitive pressure sensor.

A micro-electro-mechanical device (30; 30'), may be summarized as including a substrate (2); a first protection layer (5) impermeable to an etching chemical solution, extending on the substrate (2); a sacrificial layer (8, 8') of a material that may be removed through said etching chemical solution, extending on the first protection layer (5); a second protection layer (15) impermeable to said etching chemical solution, extending on the sacrificial layer (8, 8'); a first membrane layer (20) of a porous material which is permeable to said etching chemical solution; a cavity (22) extending between the first membrane layer (20) and the first protection layer (5); and a second membrane layer (24) on the first membrane layer (20), configured to seal pores of the first membrane layer (20).

Said etching chemical solution may include hydrofluoric acid, HF, and said first and second protection layers (5, 15) may include crystallized Aluminum Oxide.

The first membrane layer (20) may be of porous silicon or silicon having a plurality of through holes or pores.

The second membrane layer (24) may be of doped amorphous silicon.

The device may further include a conductive layer (4) on the substrate (2), wherein the first protection layer (5) extends above the conductive layer (4), and wherein said conductive layer (4) and said second membrane layer (24) may be capacitively coupled to each other through the cavity (22).

The conductive layer (4) may be of doped polysilicon.

The device may further include a buried chamber (42) in the substrate (2) below, and at least partially aligned with, the cavity (22).

The device according may further include a through opening fluidically connected between the cavity (22) and an environment external to said micro-electro-mechanical device (30; 30').

The device may further include an anti-stiction layer internally covering the cavity (22), the anti-stiction layer including a material from among chlorosilane, trichlorosilane, dichlorosilane, siloxane.

The device may further include a package (32) having an internal housing and being provided with a first access channel (32a; 32b) and with a second access channel (32b; 32a) towards said internal housing, wherein one of the first and second access channels (32a; 32b) may be coupled to the through opening through fluid-tight means or systems configured to prevent a fluidic connection between said internal housing of the package (32) and said cavity (22).

Said micro-electro-mechanical device (30; 30') may be a capacitive pressure sensor.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for manufacturing a micro-electro-mechanical device, the method comprising:
    forming, on a substrate, a first protection layer impermeable to an etching chemical solution;
    forming, on the first protection layer, a sacrificial layer of a material configured to be removed through said etching chemical solution;
    forming, on the sacrificial layer, a second protection layer impermeable to said etching chemical solution;
    exposing a sacrificial portion of the sacrificial layer by selectively removing a portion of the second protection layer;
    forming, on the second protection layer and on the exposed sacrificial portion, a first structural layer, a portion of the first structural layer on the second protection layer being spaced from the sacrificial layer by the second protection layer:
    exposing a plurality of portions of the sacrificial portion by selectively removing portions of the first structural layer:
    forming, on the first structural layer and on the exposed plurality of portions of the sacrificial portion, a first membrane layer of a porous material, which is permeable to said etching chemical solution, a portion of the first membrane layer on the portion of the first structural layer being spaced from the second protection layer by the portion of the first structural layer,
    forming a cavity by removing the sacrificial portion through the first membrane layer using said etching chemical solution; and
    sealing pores of the first membrane layer by forming a second membrane layer on the first membrane layer.

2. The method according to claim 1, wherein said etching chemical solution includes hydrofluoric acid (HF), and said first and second protection layers include crystallized aluminum oxide.

3. The method according to claim 1, wherein the first membrane layer includes porous silicon or silicon having a plurality of through holes.

4. The method according to claim 1, wherein forming the second membrane layer includes depositing doped amorphous silicon by a plasma-enhanced chemical vapor deposition (PECVD) technique.

5. The method according to claim 1, further comprising:
    forming, on the substrate, a conductive layer,
    wherein the forming the first protection layer includes forming the first protection layer on the conductive layer, and
    said conductive layer and said second membrane layer are capacitively coupled to each other.

6. The method according to claim 5, wherein the conductive layer includes doped polysilicon.

7. The method according to claim 1, further comprising:
    forming a buried chamber in the substrate below, and at least partially aligned with the cavity.

8. The method according to claim 1, further comprising:
    fluidically connecting the cavity with an environment external to said micro-electro-mechanical device through a through opening.

9. The method according to claim 8, further comprising:
    internally covering the cavity with an anti-stiction layer by causing chemical species including chlorosilanes, trichlorosilanes, dichlorosilanes, siloxanes, or a combination thereof to flow through said through opening.

10. The method according to claim 8, further comprising:
    arranging said micro-electro-mechanical device inside a package including an internal housing, a first access channel, and a second access channel; and
    fluidically coupling one of the first or second access channels to the through opening without a fluidic connection between said internal housing of the package and said cavity.

11. The method according to claim 1, wherein said micro-electro-mechanical device is a capacitive pressure sensor.

12. A method, comprising:
    forming, on a substrate, an insulating layer;
    forming, on the insulating layer, a first structural layer;
    forming, on the first structural layer, a first etch stop layer;
    forming, on the first etch stop layer, a sacrificial layer, the sacrificial layer including a trench that delimits a portion of the sacrificial layer, the trench extending through the sacrificial layer and exposing a surface of the first etch stop layer;
    forming, on the sacrificial layer-and, in the trench, and on the surface of the first etch stop layer, a second etch stop layer, the second etch stop layer including an opening aligned with the portion of the sacrificial layer and exposing a surface of the sacrificial layer;
    forming, on the second etch stop layer, in the opening, and on the surface of the sacrificial layer, a second structural layer, the second structural layer including a plurality of openings aligned with the portion of the sacrificial layer and exposing the surface of the sacrificial layer;
    forming, on the second structural layer, in the plurality of openings, and the surface of the sacrificial layer, a permeable layer; and
    forming a chamber by removing the portion of the sacrificial layer.

13. The method of claim 12, further comprising:
    forming, on the permeable layer, a sealing layer.

14. The method of claim 12, further comprising: fluidically coupling the chamber to a surrounding environment by forming a channel extending through the second etch stop layer, the second structural layer, and the permeable layer.

15. The method of claim 12, further comprising:
    forming, on a plurality of walls of the chamber, an anti-stiction layer.

16. A method, comprising:
    forming, on a substrate, an insulating layer;
    forming, on the insulating layer, a first structural layer;
    forming, on the first structural layer and the insulating layer, a first protection layer, the first protection layer being spaced from the substrate by the insulating layer;
    forming, on the first protection layer, a sacrificial layer;

forming, on the sacrificial layer, a second protection layer, the second protection layer being spaced from the first protection layer by the sacrificial layer the second protection layer including an opening directly overlying the sacrificial layer;

forming, on the second protection layer and in the opening of the second protection layer, a second structural layer, a portion of the second structural layer on the second protection layer being spaced from the sacrificial layer by the second protection layer the second structural layer including a plurality of openings directly overlying the sacrificial layer;

forming, on the second structural layer and in the plurality of openings of the second structural layer, a permeable layer, a portion of the permeable layer on the portion of the second structural layer being spaced from the second protection layer by the portion of the second structural layer; and forming a chamber by removing at least a portion of the sacrificial layer.

17. The method of claim 16, further comprising:
forming, on the permeable layer, a sealing layer.

18. The method of claim 16 wherein the permeable layer is permeable to an etching chemical solution.

19. The method of claim 16 wherein the first protection layer and the second protection layer are impermeable to an etching chemical solution.

20. The method of claim 19, wherein the etching chemical solution includes hydrofluoric acid (HF), and the first protection layer and the second protection layer include crystallized aluminum oxide.

21. The method of claim 16 wherein the portion of the sacrificial layer is removed by an etching chemical solution.

22. The method according to claim 16, wherein the permeable layer includes porous silicon.

23. The method of claim 16, further comprising: fluidically coupling the chamber to a surrounding environment by forming a channel extending through the second protection layer, the second structural layer, and the permeable layer.

24. The method of claim 16, further comprising:
forming, on a plurality of walls of the chamber, an anti-stiction layer.

25. The method of claim 16, further comprising:
forming a buried chamber in the substrate.

* * * * *